US011341826B1

(12) United States Patent
Wiley et al.

(10) Patent No.: US 11,341,826 B1
(45) Date of Patent: May 24, 2022

(54) APPARATUS, SYSTEM, AND METHOD FOR ROBOTIC SENSING FOR HAPTIC FEEDBACK

(71) Applicant: Meta Platforms, Inc., Menlo Park, CA (US)

(72) Inventors: Scott C. Wiley, Los Altos, CA (US); Michael Epstein, Danville, CA (US); Ahmad Byagowi, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 157 days.

(21) Appl. No.: 16/106,919

(22) Filed: Aug. 21, 2018

(51) Int. Cl.
  *G08B 6/00* (2006.01)
  *B25J 13/02* (2006.01)
  *B25J 15/10* (2006.01)
  *G06N 3/00* (2006.01)

(52) U.S. Cl.
  CPC .............. *G08B 6/00* (2013.01); *B25J 13/025* (2013.01); *B25J 15/10* (2013.01); *G06N 3/008* (2013.01)

(58) Field of Classification Search
  CPC ........... G08B 6/00; B25J 15/10; B25J 13/025; G06N 3/008
  See application file for complete search history.

(56) References Cited

U.S. PATENT DOCUMENTS

| 10,500,735 | B1 * | 12/2019 | Menon | B25J 15/0061 |
| 2014/0135991 | A1 * | 5/2014 | Summer | B25J 13/084 |
| | | | | 700/264 |
| 2016/0025615 | A1 * | 1/2016 | Fishel | G01N 19/00 |
| | | | | 702/33 |
| 2016/0059412 | A1 | 3/2016 | Oleynik | |
| 2016/0342207 | A1 | 11/2016 | Beran | |
| 2016/0363997 | A1 | 12/2016 | Black et al. | |
| 2017/0168565 | A1 | 6/2017 | Cohen et al. | |
| 2017/0300115 | A1 | 10/2017 | Kerr et al. | |
| 2019/0291277 | A1 * | 9/2019 | Oleynik | B25J 9/163 |
| 2020/0035071 | A1 | 1/2020 | Anderson et al. | |

FOREIGN PATENT DOCUMENTS

CN 105718884 A * 6/2016

OTHER PUBLICATIONS

Preinterview First Office Action received for U.S. Appl. No. 16/106,869 dated Aug. 15, 2019, 10 pages.
Non-Final Office Action received for U.S. Appl. No. 16/106,869 dated Dec. 30, 2019, 26 pages.

(Continued)

*Primary Examiner* — Basil T. Jos
(74) *Attorney, Agent, or Firm* — FisherBroyles, LLP

(57) ABSTRACT

A robotic-arm apparatus may include a robotic hand dimensioned to approximate a size and movement of a user's hand. The robotic-arm apparatus may also include one or more tactile-sensing pads coupled to at least a portion of the robotic hand, wherein a tactile-sensing pad is configured to detect surface data about a surface in a real-world environment. Additionally, the robotic-arm apparatus may include an actuator configured to move the robotic hand to mimic a motion of a glove worn by the user's hand, wherein the glove is configured to provide haptic feedback corresponding to the surface data to the user's hand. Various other apparatuses, systems, and methods are also disclosed.

20 Claims, 8 Drawing Sheets

(56) References Cited

OTHER PUBLICATIONS

Non-Final Office Action received for U.S. Appl. No. 16/106,869 dated Oct. 6, 2020, 37 pages.
Final Office Action received for U.S. Appl. No. 16/106,869 dated Jun. 10, 2020, 28 pages.
Final Office Action received for U.S. Appl. No. 16/106,869 dated May 25, 2021, 43 pages.

* cited by examiner

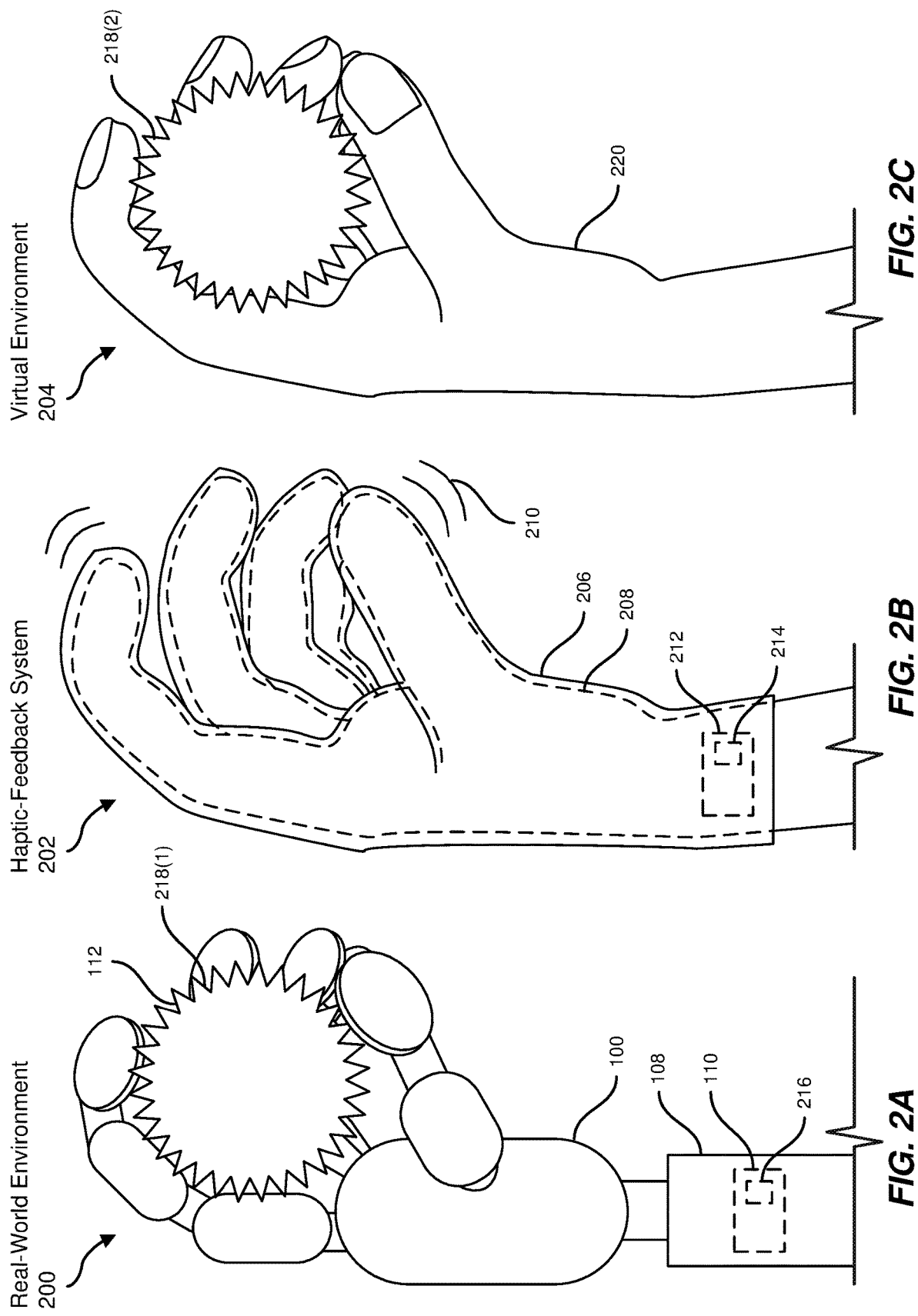

Method 500

APPARATUS, SYSTEM, AND METHOD FOR ROBOTIC SENSING FOR HAPTIC FEEDBACK

BACKGROUND

Haptic-feedback systems generally provide sensory information to simulate physical contact with objects. For example, a haptic-feedback system may be used to indicate the physical attributes of objects to users without actually touching the objects. Traditional virtual environments may often rely on visual feedback to provide a user with information about the environment. Haptic feedback may improve upon this visual information with additional sensory feedback to the user that enriches a virtual experience, such as for virtual or augmented reality systems.

However, haptic-feedback systems may not be accurate or may not provide timely information. For example, a user who wants to interact with a remote or virtual environment may need to receive signals about the environment while simultaneously manipulating the environment. Without timely feedback, the user may experience latency that interferes with his or her accurate perception of the environment, which may cause the user to perform actions that are outside of the physical bounds of the environment. Additionally, some virtual environments may rely on pre-generated haptic feedback that may change as users manipulate objects within the environment. In this example, the users may receive inaccurate haptic feedback that no longer represents a real-world environment. Thus, better methods of detecting environmental information and providing that information to users are needed to overcome these issues.

SUMMARY

As will be described in greater detail below, the instant disclosure describes various apparatuses, systems, and methods for robotic sensing for haptic feedback by utilizing a robotic-arm apparatus to sense surface information about objects that may then be used by a glove to provide accurate haptic feedback to a user wearing the glove. Additionally, the instant disclosure describes various apparatuses, systems, and methods for providing haptic-feedback to a user via a haptic-feedback device that includes a wearable article worn by the user. In one example, a robotic-arm apparatus may include a robotic hand dimensioned to approximate a size and movement of a user's hand. The robotic-arm apparatus may also include one or more tactile-sensing pads coupled to at least a portion of the robotic hand, wherein a tactile-sensing pad is configured to detect surface data about a surface in a real-world environment. Additionally, the robotic-arm apparatus may include an actuator configured to move the robotic hand to mimic a motion of a glove worn by the user's hand, wherein the glove is configured to provide haptic feedback corresponding to the surface data to the user's hand.

In some embodiments, the tactile-sensing pad may be coupled to the portion of the robotic hand such that the actuator is configured to move the tactile-sensing pad against the surface in the real-world environment.

In some examples, the tactile-sensing pad may send the surface data about the surface in the real-world environment to a computing subsystem coupled to the robotic hand to classify the surface data as at least one type of surface characteristic. In these examples, the computing subsystem may send the classified surface data to the glove worn by the user's hand, and the glove may provide the haptic feedback to the user's hand based on the at least one type of surface characteristic classified by the computing subsystem. Additionally, in these examples, the actuator may be communicatively coupled to the glove worn by the user's hand such that the actuator receives the motion of the glove via the computing subsystem.

In one embodiment, the motion of the glove worn by the user's hand may include an instruction to the robotic hand to interact with the real-world environment. According to some examples, the tactile-sensing pad may include at least one sensor that detects vibration during contact between the tactile-sensing pad and the surface in the real-world environment. In at least one example, the tactile-sensing pad may include at least one of an accelerometer, a gyroscope, a magnetometer, or an inertial measurement unit.

According to various embodiments, a corresponding haptic-feedback system may include a robotic-arm apparatus dimensioned to dynamically detect surface data about a surface in a real-world environment. The haptic-feedback system may also include a computing subsystem coupled to the robotic-arm apparatus, wherein the computing subsystem sends the surface data to a user subsystem. Furthermore, the haptic-feedback system may include a glove dimensioned to be worn on a user's hand, wherein the glove is configured to provide haptic feedback corresponding to the surface data to the user's hand based on an instruction from the user subsystem.

In one example, the robotic-arm may include one or more tactile-sensing pads configured to detect the surface data about the surface in the real-world environment. In this example, a tactile-sensing pad may send the surface data about the surface in the real-world environment to the computing subsystem.

In one embodiment, the computing subsystem may classify the surface data detected by the robotic-arm apparatus by training an artificial-intelligence model to correlate the surface data with at least one type of surface characteristic. In this embodiment, the computing subsystem may compress the classified surface data to send to the user subsystem and may send the artificial-intelligence model to the user subsystem.

In some examples, the glove may provide the haptic feedback to the user's hand by limiting a movement of the user's hand. Additionally or alternatively, the glove may provide the haptic feedback to the user's hand by exerting a pressure on the user's hand and/or stimulating a nerve of the user's hand.

In some embodiments, the user subsystem may translate the classified surface data into the instruction to the glove to provide the haptic feedback to the user's hand.

In one example, the computing subsystem may include a mapping subsystem that may detect tactile-mapping data about the real-world environment for construction of a virtual environment. In this example, the user subsystem may store the tactile-mapping data about the real-world environment in a local memory.

In addition to the various systems and apparatuses described herein, the instant disclosure presents exemplary methods for robotic sensing for haptic feedback. For example, a corresponding method may include receiving, by a computing subsystem, surface data detected by a robotic-arm apparatus about a surface in a real-world environment. The method may also include sending, by the computing subsystem, the surface data to a user subsystem configured to instruct a glove to provide haptic feedback corresponding to the surface data to a user's hand.

In one embodiment, the above method may further include classifying, by the computing subsystem, the surface data as at least one type of surface characteristic, wherein classifying the surface data may include training an artificial-intelligence model to correlate known surface data with known types of surface characteristics and using the trained artificial-intelligence model to identify at least one type of surface characteristic based on the detected surface data. In this embodiment, sending the surface data to the user subsystem may include compressing the classified surface data into the at least one type of surface characteristic, sending the surface data via a wired connection, and/or sending the surface data via a wireless connection.

In some examples, the above method may further include receiving, by the computing subsystem, a motion of the glove worn by the user's hand, wherein the user subsystem coupled to the glove detects the motion. In these examples, the above method may also include sending, by the computing subsystem, the motion of the glove to the robotic-arm apparatus, wherein the robotic-arm apparatus mimics the motion of the glove.

In further embodiments, the above method may include instructing, by the computing subsystem, the robotic-arm apparatus to detect the surface data about the surface in the real-world environment based on the motion of the glove.

According to some embodiments, a haptic-feedback device may include a wearable article dimensioned to be worn on a user's hand. The wearable article may include a haptic-feedback region that abuts a portion of the user's hand when the wearable article is worn by the user. The wearable article may also include a force application mechanism that exerts a force, in response to an instruction, against the portion of the user's hand via the haptic-feedback region to provide a sensation to the user of contact with an object surface by the portion of the user's hand when the wearable article is worn by the user.

In at least one embodiment, the force exerted by the force application mechanism against the portion of the user's hand may be varied multiple times during a tactile stimulation period in response to the instruction. In this example, the variation of the force exerted by the force application mechanism against the portion of the user's hand multiple times during the tactile stimulation period may provide a sensation to the user of at least one of texture or movement of the object surface when the wearable article is worn by the user. The force exerted by the force application mechanism against the portion of the user's hand may be varied during the tactile stimulation period according to at least one specified frequency correlated to at least one type of characteristic of the object surface.

In various embodiments, the force application mechanism may include (i) at least one ferromagnetic element disposed at the haptic-feedback region and (ii) an electromagnet that is located such that the portion of the user's hand is positioned between the at least one ferromagnetic element and the electromagnet when the wearable article is worn by the user. The electromagnet may be electrically coupled to an electrical current source such that, in response to the instruction, the electromagnet is supplied with an electrical current from the electrical current source, resulting in generation of a magnetic field around the electromagnet that draws the at least one ferromagnetic element toward the electromagnet to exert the force against the portion of the user's hand when the wearable article is worn by the user.

In some embodiments, the force application mechanism may include (i) a movement limitation member disposed at the haptic-feedback region and (ii) an extendable member including a first end coupled to the movement limitation member and a second end coupled to an actuator. In this example, when the wearable article is worn by the user, the extendable member may extend or contract in conjunction with movement of the portion of the user's hand while the actuator is in a non-actuated state. Additionally, the extendable member may be prevented from extending while the actuator is in an actuated state so as to exert the force against the portion of the user's hand via the movement limitation member. In one example, the extendable member may include a cable that extends along another portion of the user's hand when the wearable article is worn by the user.

According to at least one embodiment, the force application mechanism may include a tactile fluid member that is disposed at the haptic-feedback region, the tactile fluid member defining an interior region that is coupled to at least one fluid source. In response to the instruction, the interior region of the tactile fluid member may be supplied with at least one fluid from the at least one fluid source to exert the force against the portion of the user's hand when the wearable article is worn by the user. In one example, the at least one fluid may include a plurality of fluids. In this example, the plurality of fluids may include a gas and a liquid. The force application mechanism may further include a plurality of solid elements movably disposed within the interior region defined by the tactile fluid member. In various examples, the tactile fluid member may include an elastomeric material defining the interior region.

According to certain embodiments, the wearable article may include a glove. In various examples, the wearable article may include a plurality of haptic-feedback regions, each of the plurality of haptic-feedback regions abutting a separate fingertip of the user's hand when the wearable article is worn by the user. In this example, the force application mechanism may be configured to selectively exert one or more forces against one or more fingertips of the user's hand via one or more abutting haptic-feedback regions.

A corresponding haptic-feedback system may include (i) a user subsystem that provides an instruction based on surface data corresponding to an object surface and (ii) a wearable article dimensioned to be worn on a user's hand. The wearable article may include a haptic-feedback region that abuts a portion of the user's hand when the wearable article is worn by the user. Additionally, the wearable article may include a force application mechanism that exerts a force, in response to the instruction received from the user subsystem, against the portion of the user's hand via the haptic-feedback region to provide a sensation to the user of contact with the object surface by the portion of the user's hand when the wearable article is worn by the user.

According to at least one embodiment, the user subsystem may receive the surface data from a robotic-arm apparatus that detected the surface data about the object surface in a real-world environment. The surface data may be correlated to at least one type of characteristic of the object surface.

In some embodiments, a corresponding method may include (i) receiving an instruction from a user subsystem and (ii) in response to the instruction, exerting, by a force application mechanism of a wearable article worn on a user's hand, a force against a portion of the user's hand via a haptic-feedback region that abuts the portion of the user's hand to provide a sensation to the user of contact with a surface by the portion of the user's hand.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 2A is a side view of the robotic-arm apparatus within an exemplary real-world environment according to some embodiments.

FIG. 2B is a side view of an exemplary glove worn on a user's hand within a haptic-feedback system according to some embodiments.

FIG. 2C is a side view of a virtual hand within an exemplary virtual environment according to some embodiments.

Figure 1:
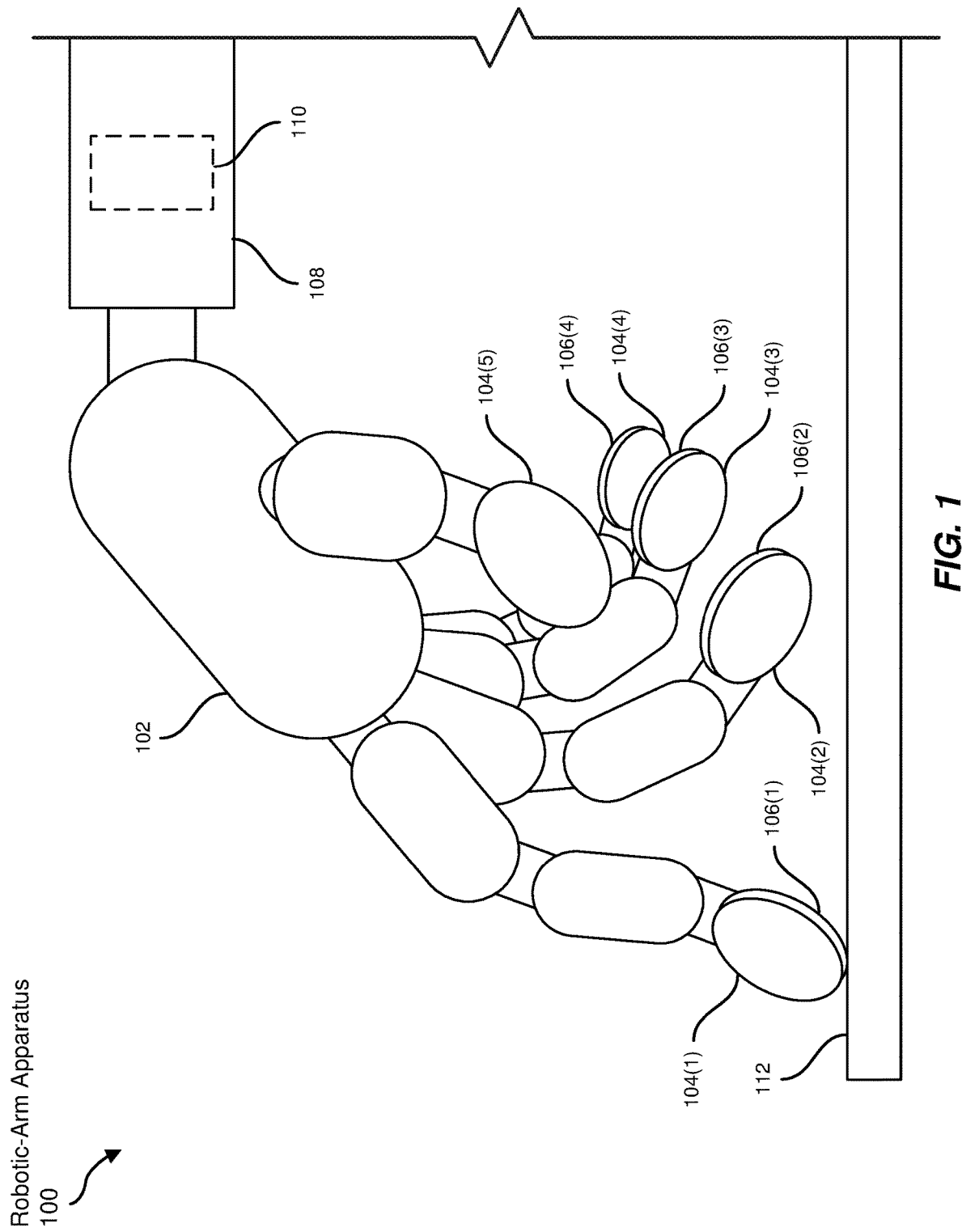
FIG. 1 is a side view of an exemplary robotic-arm apparatus according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for robotic sensing for haptic feedback. Additionally, the instant disclosure describes various apparatuses, systems, and methods for providing haptic-feedback to a user via a haptic-feedback device that includes a wearable article worn by the user. As will be explained in greater detail below, embodiments of the instant disclosure may, by utilizing a robotic-arm apparatus to detect surface information, provide timely haptic feedback to a user wearing a haptic-feedback device, such as a device that includes a glove. For example, the robotic-arm apparatus may use one or more tactile-sensing pads or other sensory technology to detect surface data in a real-world environment. Additionally, a computing subsystem may classify or manage the detected data to be used for haptic feedback. The glove worn by the user may then receive the data about the real-world surface and provide the haptic feedback to the user's hand via one or more haptic-feedback subsystems. The glove may also respond to the user's motions to instruct the robotic-arm apparatus to move. Furthermore, the surface data may be used to map a virtual environment and provide haptic feedback to the user while the user navigates the virtual environment.

The following will provide, with reference to FIG. 1 detailed descriptions of a robotic-arm apparatus. In addition, the discussion associated with FIGS. 2A, 2B, and 2C will provide examples of a haptic-feedback system using a robotic-arm apparatus and a glove to create a virtual environment. Further, the discussion associated with FIGS. 3A-3E will provide examples of haptic-feedback subsystems that may be used to deliver tactile stimulation to a user. The discussion associated with FIG. 4 will provide an example of sensing surface data within a haptic-feedback system. Furthermore, detailed descriptions of methods for robotic sensing for haptic feedback will be provided in connection with FIG. 5. Detailed descriptions of methods for providing haptic feedback to a user via a haptic-feedback device that includes a wearable article will also be provided in connection with FIG. 6.

FIG. 1 illustrates a side view of an exemplary robotic-arm apparatus 100 touching a surface 112. In one embodiment, robotic-arm apparatus 100 may include a robotic hand 102 dimensioned to approximate a size and movement of a user's hand. Robotic-arm apparatus 100 may also include tactile-sensing pads 106(1), 106(2), 106(3), and 106(4) coupled to portions 104(1), 104(2), 104(3), 104(4), and 104(5) of robotic hand 102. Tactile-sensing pads 106(1)-(4) may be configured to detect surface data about various surfaces, such as surface 112. Robotic-arm apparatus 100 may further include an actuator 108 configured to move robotic hand 102.

In the example of FIG. 1, portions 104(1)-(5) of robotic hand 102 may represent the tips of the fingers and thumb of robotic hand 102, and tactile-sensing pads 106(1)-(4) may represent elastomer pads attached to these tips to mimic the elasticity of a human hand and/or sense contact with physical surfaces, such as surface 112. Tactile-sensing pads 106(1)-(4) may include any suitable sensors for detecting contact with a surface, movement of the surface relative to the sensors, vibration of the surface, texture of the surface, and/or any other suitable characteristics of the surface. For example, tactile sensing pads 106(1)-(4) and/or any other suitable portion of robotic hand 102 may include one or more accelerometers, gyroscopes, and/or magnetometers, and/or one or more inertial measurement units (IMUS) including a combination of the foregoing. Additionally or alternatively, one or more vibration sensors and/or microphones may be used to detect vibrations and or sounds generated during contact with and/or movement along surfaces, with such vibrations and/or sounds being correlated to surface contact and/or various surface characteristics, such as surface texture. In some examples, tension or movement sensors may be utilized to determine when a portion of robotic hand 102, such as one or more portions 104(1), 104(2), 104(3), 104(4), and 104(5) in FIG. 1, are in contact with a surface. For example, a cable may be connected to portion 104(1), 104(2), 104(3), 104(4), and/or 104(5) and contact with a surface may be registered when the cable is moved or prevented from moving. In another example, one or more additional portions of robotic hand 102 may be covered with sensory material and/or tactile-sensing pads and/or robotic hand 102 may be substantially or entirely covered in sensory material and/or tactile-sensing pads such that any contact with additional portions of robotic hand 102 causes robotic-arm apparatus 100 to capture surface data.

In some embodiments, tactile-sensing pads 106(1)-(4) may be coupled to robotic hand 102 such that actuator 108 moves one or more of tactile-sensing pads 106(1)-(4) against surface 112 in a real-world environment. For example, as shown in FIG. 1, actuator 108 may move robotic hand 102 above surface 112 and, subsequently, move a finger such that tactile-sensing pad 106(1) touches surface 112.

In some examples, a haptic-feedback system may include robotic-arm apparatus 100 dimensioned to dynamically detect the surface data about surfaces, such as surface 112, and a computing subsystem 110 coupled to robotic-arm apparatus 100. In these examples, computing subsystem 110 may instruct actuator 108 to move robotic hand 102.

FIG. 2A illustrates a side view of robotic-arm apparatus 100 within an exemplary real-world environment 200. FIG. 2B illustrates a side view of an exemplary corresponding haptic-feedback device including a glove 206 dimensioned to be worn on a user's hand 208 within a haptic-feedback system 202. FIG. 2C illustrates a side view of a corresponding virtual hand 220 within an exemplary virtual environment 204.

As shown in FIGS. 2A and 2B, robotic-arm apparatus 100 may be dimensioned to approximate the size and movement of user's hand 208 wearing glove 206. Actuator 108 may move robotic-arm apparatus 100 of FIG. 2A to mimic a motion 210 of glove 206 worn on user's hand 208 in FIG. 2B. In this example, actuator 108 may be communicatively coupled to glove 206 such that actuator 108 receives motion 210 from glove 206 via computing subsystem 110. Additionally, robotic-arm apparatus 100 may mimic glove 206 to hold an object 218(1) and/or detect surface 112 of object 218(1). For example, motion 210 of glove 206 may include an instruction to robotic-arm apparatus 100 to interact with real-world environment 200, such as by picking up object 218(1).

In some examples, computing subsystem 110 of FIG. 2A may send the surface data to a user subsystem 212 of glove 206 in FIG. 2B. In these examples, computing subsystem 110 may send surface data to provide telepresence sensory feedback to glove 206. Subsequently, glove 206 may be configured to provide haptic feedback to user's hand 208 based on the surface data detected by robotic-arm apparatus 100 about object 218(1). For example, the surface data may include data about a dimension of object 218(1), at least one characteristic, such as a texture, of surface 112, a resistance of object 218(1) indicating hardness, and/or any other suitable tactile information about object 218(1).

In the above examples, glove 206 of FIG. 2B may provide the haptic feedback to user's hand 208 by limiting a movement of user's hand 208, exerting a pressure on user's hand 208, and/or stimulating (e.g., electrically stimulating) a nerve of user's hand 208. For example, glove 206 may use electromagnets mounted on each finger of glove 206 to pull steel material in glove 206 to create force on the fingertips of user's hand 208. In another example, cables running along the dorsal side of glove 206 may exert resistance on glove 206 to limit a range of motion of individual fingers of user's hand 208. In a further example, glove 206 may include a liquid that moves within glove 206 to provide a sense of movement against the skin of user's hand 208. In some embodiments, glove 206 may provide different haptic feedback depending on the movement of user's hand 208. For example, a motion to brush against surface 112 may trigger the liquid in glove 206 to provide a sensation of a texture of surface 112, while a clenching motion may trigger resistance forces to limit the motion of fingers in glove 206 to imitate a feeling of contacting a hard surface. In some examples, glove 206 may include one or more gyroscopes mounted on each finger of glove 206 to provide a sensation of surface contact and/or motion in fingers of user's hand 208.

In one embodiment, as shown in FIGS. 2A and 2C, computing subsystem 110 may include a mapping subsystem 216 that detects tactile-mapping data about real-world environment 200 for the construction of virtual environment 204. In this embodiment, virtual environment 204 may represent physical features and objects present in real-world environment 200. For example, virtual environment 204 of FIG. 2C may include a virtual object 218(2) that represents real-world object 218(1) of FIG. 2A. Glove 206 may then provide haptic feedback to user's hand 208 based on virtual hand 220 interacting with virtual environment 204.

Additionally, in the above embodiment, user subsystem 212 may store the tactile-mapping data in a local memory 214. In at least one example, rather than using real-time surface data transmitted from robotic-arm apparatus, glove 206 may utilize tactile-mapping data from local memory 214 that has been previously stored for at least some surfaces or surface types, thereby reducing latency in the haptic feedback of virtual environment 204 provided to the user. Glove 206 may store the tactile-mapping data in local memory 214 in place of or in addition to receiving real-time surface data from robotic-arm apparatus 100 in real-world environment 200. In these embodiments, glove 206 may, for example, send motion 210 to virtual environment 204, and virtual hand 220 may emulate motion 210. Thus, user's hand 208 may remotely interact with real-world environment 200 with the aid of mapping subsystem 216 and/or interact with virtual environment 204. For example, glove 206 may pair with virtual-reality goggles to provide an immersive virtual-reality experience.

Although illustrated as a single robotic-arm apparatus 100 communicatively connected to a single glove 206, haptic-feedback system 202 may additionally include one glove and robotic-arm apparatus pairing for a user's right hand and a separate glove and robotic-arm apparatus for the user's left hand. In this example, both gloves and/or both robotic-arm apparatuses may operate as a cooperative system to provide haptic feedback to the user.

FIGS. 3A-3E illustrate various exemplary haptic-feedback subsystems that may provide sensory feedback to a user in accordance with some embodiments. The haptic-feedback subsystems shown in these figures may be included in a haptic-feedback device that includes a wearable article dimensioned to be worn on a user's hand, such as glove 206 of haptic-feedback system 202 of FIG. 2B, and/or in any other suitable article worn and/or mounted on at least a portion of the user's body. The wearable article may include a haptic-feedback region that abuts a portion of the user's hand when the wearable article is worn by the user. The wearable article may also include a force application mechanism that exerts a force, in response to an instruction (e.g., an instruction from user subsystem 212 shown in FIGS. 2A-2C), against the portion of the user's hand via the haptic-feedback region to provide a sensation to the user of contact with an object surface by the portion of the user's hand when the wearable article is worn by the user. In at least one embodiment, two or more of the haptic-feedback subsystems illustrated in FIGS. 3A-3E may be used in conjunction with one another and/or at least one of the illustrated haptic-feedback subsystems may be used in conjunction with one or more other haptic-feedback subsystems, without limitation.

Figure 3A:
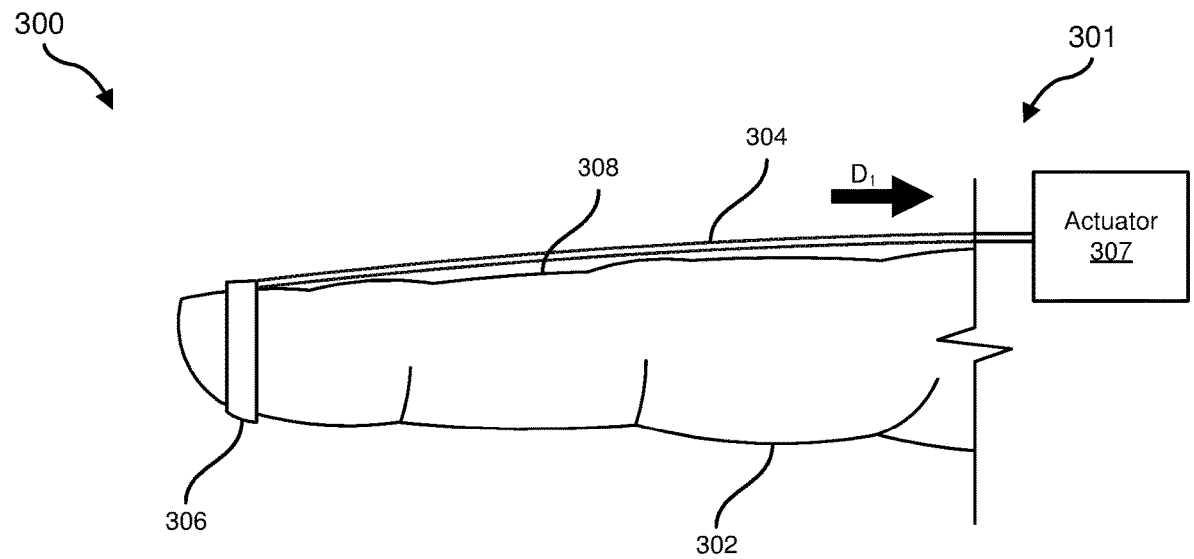
FIG. 3A is a side view of a haptic-feedback subsystem mounted on a finger of a user according to some embodiments.

As shown in FIG. 3A, a haptic-feedback subsystem 300 may be mounted on a finger 302 of a user and may include a force application mechanism 301 that includes an extendable member, such as a cable 304, coupled to a movement limitation member 306 and an actuator 307. According to some embodiments, as shown in FIG. 3A, cable 304 may extend along a backside 308 of the user's finger 302. Cable 304 may be coupled at one end to movement limitation member 306 and may be coupled at an opposite second end to an actuator 307. Movement limitation member 306 may be disposed at a haptic-feedback region and may include, for example, a collar or other wearable member that extends around and abuts at least a portion of finger 302, such as around the fingertip of finger 302. In some examples, cable 304 may extend or contract in conjunction with movement of a portion of the user's hand, such as the user's finger and/or fingertip while actuator 307 is in a non-actuated state. Additionally, cable 304 may be prevented from extending while actuator 307 is in an actuated state so as to exert a force against a portion of the user's hand via movement limitation member 306. According to at least one example, cable 304 may be held in position and/or may be drawn in direction $D_1$ shown in FIG. 3A by actuator 307, thereby exerting a force on movement limitation member 306, which exerts a corresponding force against the user's fingertip that restrains or forces movement of user's finger 302. Accordingly, the user may be prevented by movement limitation member 306 from closing and/or otherwise moving finger 302, giving the user the sensation that their fingertip is contacting a surface.

Figure 3B:
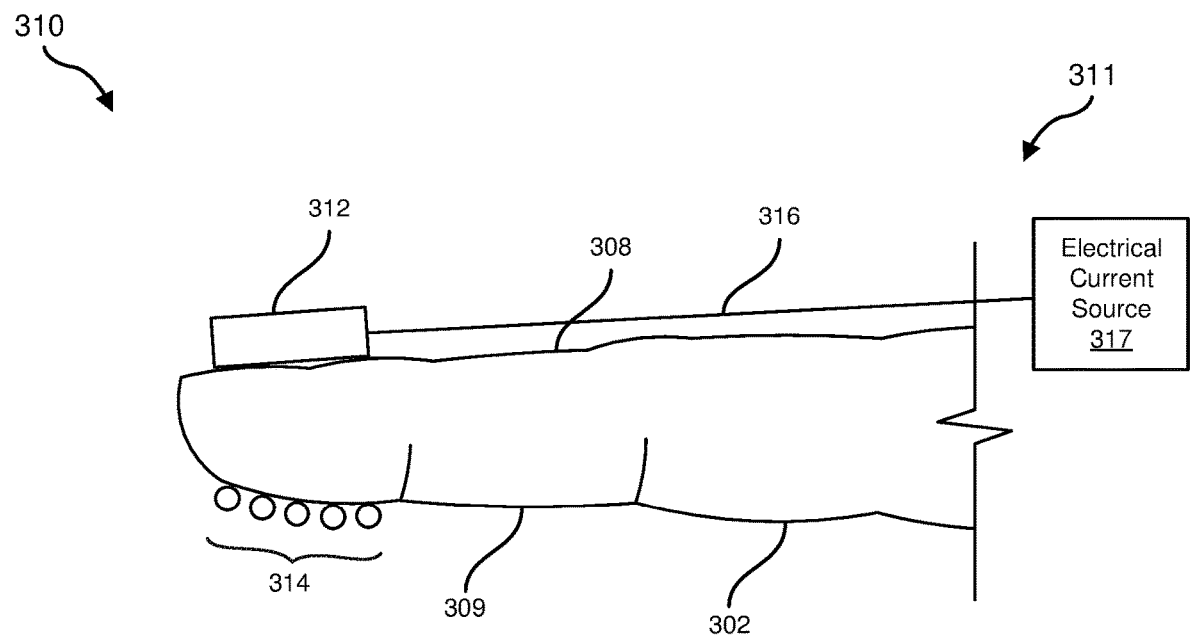
FIG. 3B is a side view of a haptic-feedback subsystem mounted on a finger of a user according to some embodiments.

FIG. 3B illustrates a haptic-feedback subsystem 310 that is mounted on a finger 302 of user. As shown in this figure, haptic-feedback subsystem 310 may include a force application mechanism 311 that includes an electromagnet 312, which is electrically coupled to an electrical current source 317 via wiring 316, and at least one ferromagnetic element 314. For example, haptic-feedback subsystem 310 may include a plurality of ferromagnetic elements 314 (e.g., steel ball bearings and/or any other suitable ferromagnetic elements) that are disposed at a haptic-feedback region and positioned in close proximity to and/or abutting a portion of user's finger 302, such as the fingertip of finger 302. In some embodiments, as illustrated in FIG. 3B, electromagnet 312 may be disposed on a backside 308 of the fingertip and ferromagnetic elements 314 may be disposed oppositely on the front side 309 of the fingertip (e.g., against the fingertip pad) such that the fingertip is positioned between ferromagnetic elements 314 and electromagnet 312.

According to at least one embodiment, an electrical current may be supplied to electromagnet 312 by electrical current source 317 via wiring 316. As the electrical current flows through electromagnet 312, a magnetic field surrounding electromagnet 312 may be generated. Ferromagnetic elements 314, which are disposed within the generated electromagnetic field, may be drawn toward electromagnet 312 such that one or more of ferromagnetic elements 314 are pressed more forcefully against the fingertip of user's finger 302, exerting a force against the fingertip that may give the user the sensation that their fingertip is contacting a surface. According to some examples, vibration information obtained, for example, by a robotic hand (e.g., robotic hand 102 shown in FIGS. 1 and 2A) may be converted to a fluctuating current that is delivered to electromagnet 312 such that ferromagnetic elements 314 are pressed against the user's fingertip in a manner that gives rise to a sensation by the user of contacting a vibrating surface.

Figure 3C:
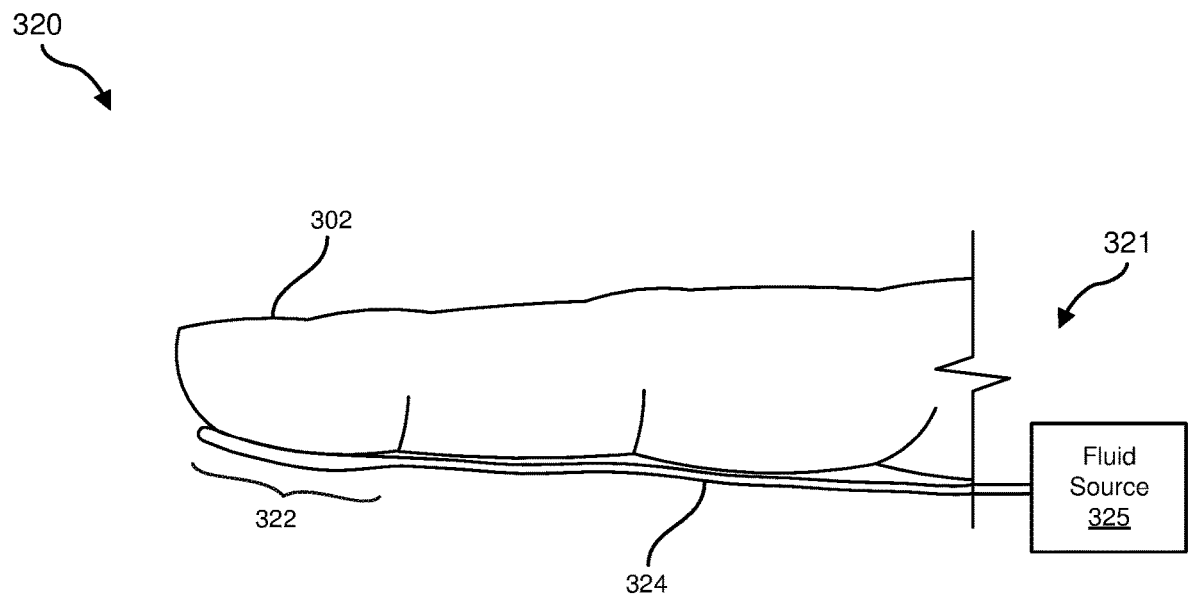
FIG. 3C is a side view of a haptic-feedback subsystem mounted on a finger of a user according to some embodiments.

FIG. 3C illustrates a haptic-feedback subsystem 320 that may utilize fluid flow to provide haptic feedback to a user. In some embodiments, as shown in FIG. 3C, haptic-feedback subsystem 320 may include a force application mechanism 321 that includes a tactile fluid member 322 disposed at a haptic-feedback region against a portion of the user's finger 302, such as the user's fingertip, and at least one fluid source 325 coupled to tactile fluid member 322 via a flow channel 324 (e.g., tubing). Tactile fluid member 322 may define an interior region through which a selected fluid and/or combination of fluids from the at least one fluid source 325 may be passed to exert a force against and provide sensory stimulation to an adjacent region of the user's finger 302. According to at least one example, tactile fluid member 322 may include a flexible and/or expandable material, such as an elastomeric polymer material, surrounding and defining the interior region. Tactile fluid member 322 may be in fluid communication with one or more fluid sources 325 via a flow channel 324. At least one fluid, such as a liquid (e.g., water, oil, a viscous liquid medium, etc.), a gas (e.g., air, etc.), and/or a combination of liquids and gases, may be delivered into and/or through tactile fluid member 322. In some embodiments, the at least one fluid may include a fluid having a viscosity greater than a viscosity of water. For example, the at least one fluid may have a viscosity of approximately 10 centipoise (cP) or more (e.g., approximately 20 cP, approximately 30 cP, approximately 40 cP, approximately 50 cP, approximately 100 cP, approximately 200 cP, approximately 300 cP, approximately 400 cP, approximately 500 cP, greater than approximately 500 cP).

In various embodiments, fluid delivered to tactile fluid member 322 may increase the pressure within tactile fluid member 322 so as to expand and/or increase the rigidity of tactile fluid member 322, causing tactile fluid member 322 to exert an increased force against a portion of finger 302 and/or restraining movement of finger 302, giving the user the sensation that their fingertip is contacting a surface. Following a tactile stimulation period, fluid within tactile fluid member 322 may be subsequently released via flow channel 324 and/or another exit channel. In some examples, a tactile fluid member may be disposed against a backside of the user's finger 302 to restrain bending of finger 302 when fluid is delivered to the tactile fluid member. In some embodiments, a fluid may be flowed through tactile fluid member 322 of FIG. 3C for a selected period of time to provide the user with a sense of movement of a surface against an adjacent portion of their finger 302. In at least one example, a plurality of solid elements may be movably disposed within the interior region defined by tactile fluid member 322 to provide additional sensory feedback to the user as one or more fluids are passed into and/or through tactile fluid member 322.

Figure 3D:
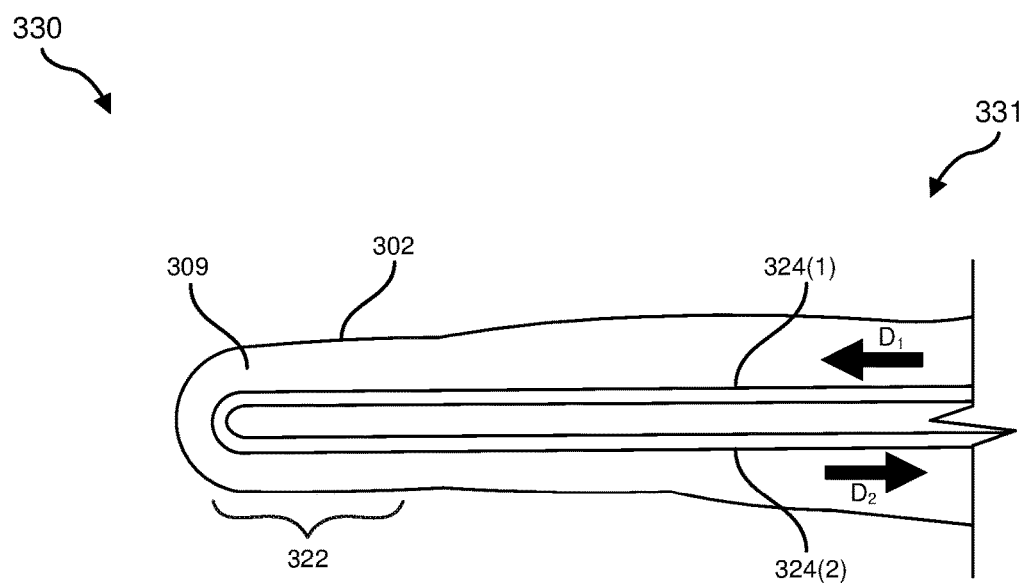
FIG. 3D is a bottom view of a haptic-feedback subsystem mounted on a finger of a user according to some embodiments.

FIG. 3D illustrates a haptic-feedback subsystem 330 that may utilize fluid flow to provide haptic feedback to a user in accordance with some embodiments. Haptic-feedback subsystem 330 may include a force application mechanism 331 that includes a tactile fluid member 322 disposed at a haptic-feedback region against a portion of the user's finger 302, such as a front side 309 of the user's fingertip as shown in this figure, and at least one fluid source (e.g., at least one fluid source 325 shown in FIG. 3C) coupled to tactile fluid member 322 via a flow channel 324. According to some embodiments, fluid flow through tactile fluid member 322 may produce a sensation by a user of contact with a surface and/or movement of the surface relative to an adjacent portion of their finger 302. As illustrated in FIG. 3D, fluid may be delivered to tactile fluid member 322 in, for example, direction $D_1$, via an inlet flow channel 324(1). Additionally, fluid may exit from tactile fluid member 322 in, for example, direction $D_2$, via an outlet flow channel 324(2). In at least one example, fluid may be passed through tactile fluid member 322 in directions opposite to that shown in FIG. 3D. For example, the direction of fluid flow may be reversed as desired such that the fluid flows from outlet flow channel 324(2) to inlet flow channel 324(1) during certain periods.

Any suitable fluid or combination of fluids may be passed through tactile fluid member 322 so as to produce within the user a sensation of contacting a surface and/or a sensation of movement of a surface relative to their finger. For example, during a tactile stimulation period, one or more fluids may be flowed through tactile fluid member 322 in a substantially constant rate. Additionally or alternatively, flow of one or more fluids may be pulsed at a selected frequency and/or may be varied in an irregular manner during a stimulation period. According to at least one embodiment, a combination of a liquid (e.g., water or a higher viscosity liquid) and a gas (e.g., air) may be flowed through tactile fluid member 322 to provide various desired sensations to the user's finger 302. For example, inlet flow channel 324(1) may be coupled to a branched member, such as a fluid y-splitter, having branches that respectively receive a gas input from a gas source (e.g., an air pump) and a liquid input from a liquid source (e.g., a water pump). In at least one example, the liquid and gas may be simultaneously and/or alternately supplied to tactile fluid member 322 to produce a fluid medium having bubbles and/or pockets of air defined within the liquid. In some examples, the liquid and gas may be injected into inlet flow channel 324(1) in an alternating manner such that the liquid and pockets of air in the liquid are passed through tactile fluid member 322 at a selected frequency to provide a sensation of surface texture and/or movement.

In certain embodiments, different temperatures of fluid may be respectively coupled to different branches of a branched member coupled to inlet flow channel 324(1). For example, a relatively colder liquid may be coupled to a first branch and a relatively warmer liquid may be coupled to a second branch. The different temperatures of fluid may be selectively delivered individually and/or in various combinations to tactile fluid member 322 to provide the user with sensations of contacting surfaces having various temperatures. In some examples, various small objects and/or particles may be disposed within tactile fluid member 322 to enhance tactile sensations experienced by the user and/or to provide additional tactile sensations (e.g., surface texture, movement, etc.).

Figure 3E:
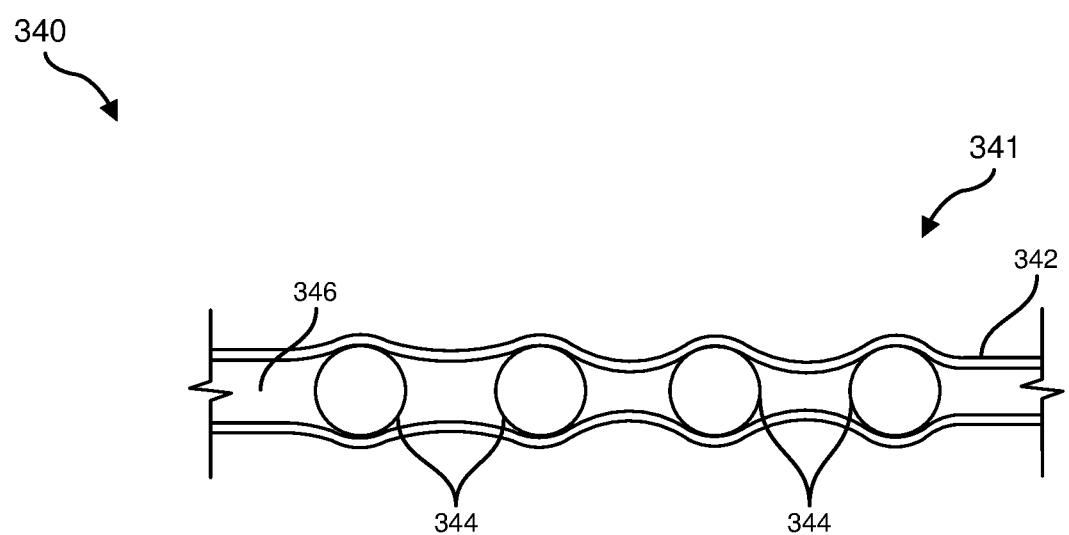
FIG. 3E is a cross-sectional side view of a portion of a haptic-feedback subsystem according to some embodiments.

FIG. 3E illustrates a portion of a haptic-feedback subsystem 340 (e.g., at least a portion of tactile fluid member 322 of FIGS. 3C and 3D) that may utilize flow of a fluid and corresponding movement of solid materials to provide haptic feedback to a user in accordance with some embodiments. As shown in FIG. 3E, haptic-feedback subsystem 340 may include a force application mechanism 341 that includes a section of flexible tubing 342 that is disposed at a haptic-feedback region (e.g., tactile fluid member 322 in FIGS. 3C and 3D). Flexible tubing 342 may define an interior region that includes solid elements 344 and a fluid medium 346 (e.g., a liquid, a gas, etc.). Solid elements 344 may include, for example, particles and/or rounded elements formed of any suitable material. In some embodiments, fluid medium 346 may include a relatively viscous liquid suitable for moving solid elements 344 within flexible tubing 342. As shown in FIG. 3E, solid elements 344 may be larger than an inner diameter of flexible tubing 342 such that flexible tubing is expanded outward in regions adjacent to solid elements 344.

Fluid medium 346 may be passed through flexible tubing 342 and/or may exert an increased pressure against solid elements 344 in a selected direction, resulting in movement of solid elements 344 within flexible tubing. Such movement of solid elements 344 may exert a varying force against adjacent regions of a user's body, such as a portion of the user's finger 302 (see FIGS. 3A-3D), as expanded regions of flexible tubing 342 abutting the portion of the user's finger change and move in conjunction with the movement solid elements 344. Such movement may provide the user with a sensation of contact with and/or movement of a surface. In some examples, the movement perceived by the user may give the user a sensation of touching a textured surface and/or small objects (e.g., debris, etc.) on a surface. According to at least one example, solid elements 344 may include a ferromagnetic material such that solid elements 344 may be further moved within flexible tubing 342 and/or forced against an adjacent portion of the user's body by an electromagnet (e.g., electromagnet 312 in FIG. 3B).

In the haptic-feedback subsystems illustrated in FIGS. 3A-3E, a force may be exerted by a force application mechanism against a portion of a user's hand, such as the user's fingertip, in any suitable manner. For example, a force may be continuous and/or may be varied as desired to provide tactile feedback corresponding to different types of surfaces. In some embodiments, the applied force may be varied multiple times during a tactile stimulation period in response to an instruction (e.g., an instruction from user subsystem 212 shown in FIGS. 2A-2C). For example, the force may be applied in a pulsing and/or otherwise fluctuating manner. The variation of the force exerted by the force application mechanism may provide a sensation to the user of at least one of texture or movement of an object surface. According to various examples, the force exerted by the force application mechanism against a portion of a user's hand may be varied during a tactile stimulation period according to at least one specified frequency correlated to at least one type of characteristic of an object surface (e.g., a texture of the surface). In at least one example, the varying force applied by the force application mechanism may correspond to surface data, such as vibrational and/or sound data, obtained by one or more sensors of a robotic hand (e.g., sensors of tactile-sensing pads 106(1)-(4) of robotic hand 102 shown in FIG. 1) during contact with and/or movement along an object surface in a real-world environment.

Figure 4:
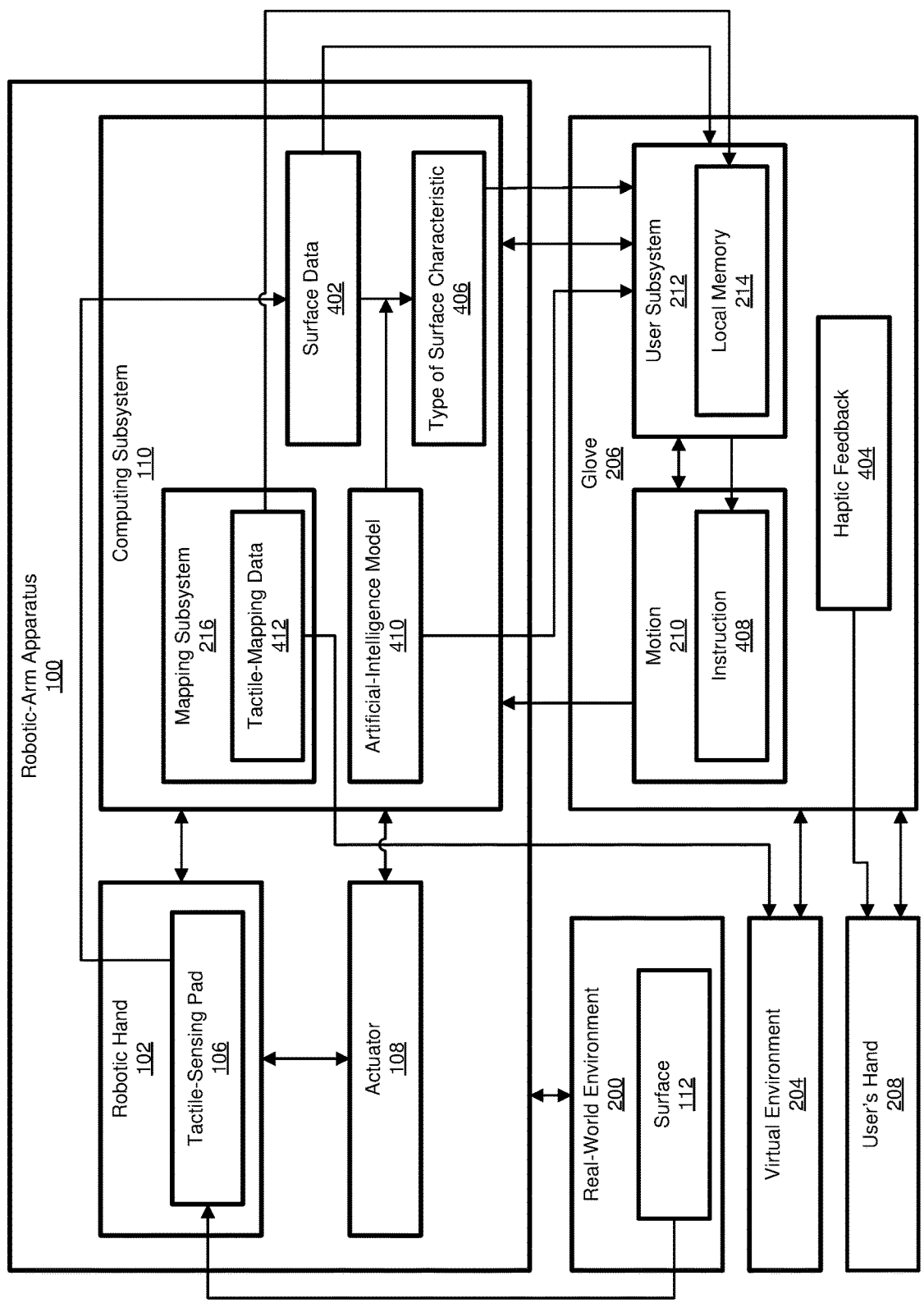
FIG. 4 is a block diagram of an exemplary detection of surface data according to some embodiments.

FIG. 4 illustrates a block diagram of an exemplary detection of surface data 402. As shown in FIG. 4, robotic-arm apparatus 100 may include robotic hand 102 with a tactile-sensing pad 106 that detects surface data 402 about surface 112 in real-world environment 200. Computing subsystem 110 of robotic-arm apparatus 100 may send surface data 402 to a haptic-feedback system that includes user subsystem 212 of glove 206 worn by user's hand 208. Actuator 108 may be communicatively coupled to glove 206 and may receive motion 210 of glove 206 via computing subsystem 110 to move robotic hand 102. Additionally, motion 210 may include an instruction 408 to robotic hand 102 to interact with real-world environment 200.

In some embodiments, tactile-sensing pad 106 may send surface data 402 about surface 112 to computing subsystem 110 to classify surface data 402 as at least one type of surface characteristic 406. In these embodiments, computing subsystem 110 may classify surface data 402 by training an artificial-intelligence model 410 to correlate surface data 402 with at least one type of surface characteristic 406, such as a type of texture. Additional surface characteristics correlated with surface data 402 may include, without limitation, surface rigidity, surface size, surface movement, surface temperature, and/or any other suitable characteristics. For example, artificial-intelligence model 410 may correlate various vibration profiles detected by tactile-sensing pad 106 with different types of surfaces and, therefore, classify surface data 402 based on the vibration profile of surface 112. In these embodiments, computing subsystem 110 may then send classified surface data 402, at least one type of surface characteristic 406, and/or other surface characteristics to glove 206.

In other embodiments, computing subsystem 110 may compress classified surface data 402 to send to user subsystem 212 of glove 206. Additionally or alternatively, computing subsystem 110 may send artificial-intelligence model 410 to user subsystem 212 to classify surface data 402 locally.

In some examples, glove 206 may be configured to provide haptic feedback 404 to user's hand 208 based on instruction 408 received from user subsystem 212 by, for example, force application mechanism 301, 311, 321, 331, or 341 shown in FIGS. 3A-3E. Additionally or alternatively, glove 206 may provide haptic feedback 404 based on surface data 402, at least one type of surface characteristic 406, and/or other surface characteristics classified by computing subsystem 110. In these examples, user subsystem 212 may translate classified surface data 402 into instruction 408 to provide haptic feedback 404 to user's hand 208.

In one embodiment, computing subsystem 110 may include mapping subsystem 216, and mapping subsystem 216 may detect tactile-mapping data 412 about real-world environment 200 for construction of virtual environment 204. In this embodiment, user subsystem 212 of glove 206 may store tactile-mapping data 412 in local memory 214 to reduce latency in transmission of haptic feedback 404 to the user related to virtual environment 204. Furthermore, in this embodiment, glove 206 may represent a portion of a virtual-reality or augmented-reality system that generates virtual environment 204.

Although illustrated as a part of robotic-arm apparatus 100 in FIG. 4, computing subsystem 110 may represent all or a part of a computing device communicatively coupled to robotic-arm apparatus 100. Similarly, user subsystem 212 may represent all or a part of a computing device communicatively coupled to glove 206 while local memory 214 may continue to reside on glove 206. Additionally or alternatively, a separate computing device may include both computing subsystem 110 and user subsystem 212.

Figure 5:
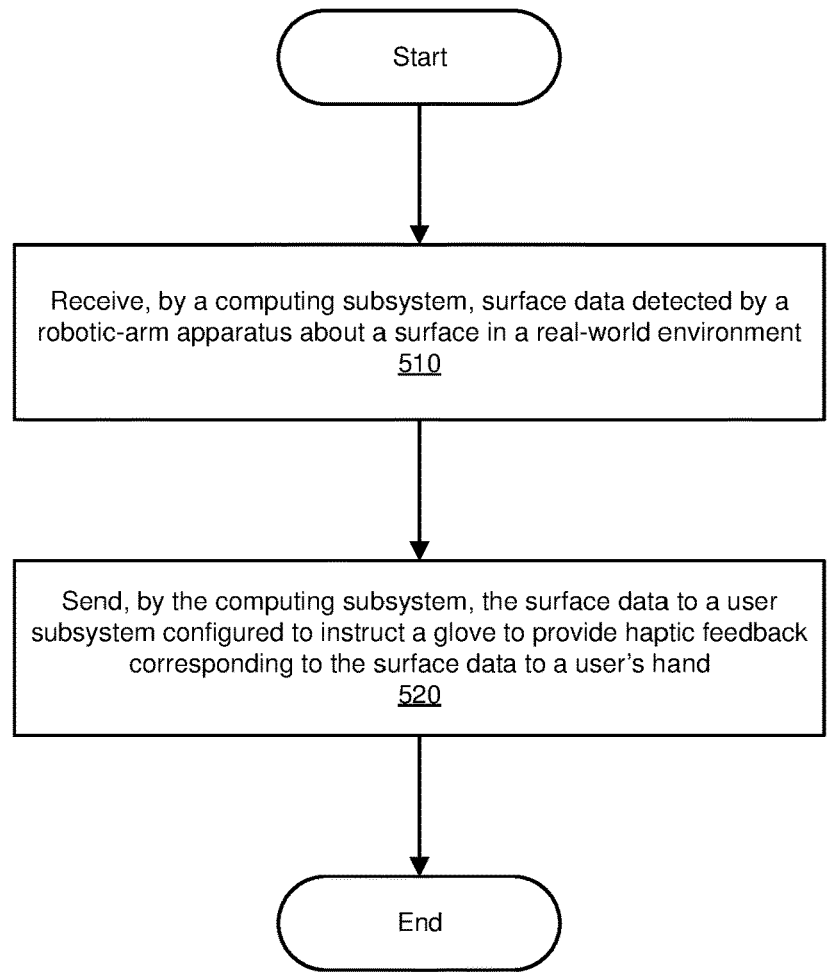
FIG. 5 is a flow diagram of an exemplary method for robotic sensing for haptic feedback according to some embodiments.

FIG. 5 shows a flow diagram of an exemplary computer-implemented method 500 for implementing robotic sensing for haptic feedback. The steps shown in FIG. 5 may be performed by any suitable computer-executable code and/or computing system, including computing subsystem 110 of robotic-arm apparatus 100 in FIG. 1. In one example, each of the steps shown in FIG. 5 may represent an algorithm whose structure includes and/or is represented by multiple sub-steps, examples of which will be provided in greater detail below.

As illustrated in FIG. 5, at step 510, one or more of the systems described herein may receive, by a computing subsystem, surface data detected by a robotic-arm apparatus about a surface in a real-world environment. For example, as illustrated in FIG. 4, computing subsystem 110 may receive surface data 402 detected by robotic-arm apparatus 100 about surface 112 in real-world environment 200.

The systems described herein may perform step 510 of FIG. 5 in a variety of ways. Computing subsystem 110 of FIG. 4 may instruct robotic hand 102 to move such that tactile-sensing pad 106 detects surface data 402 and sends surface data 402 to computing subsystem 110. In some examples, robotic hand 102 may send surface data 402 to computing subsystem 110 via a wired connection, such as in the example of FIG. 1 wherein computing subsystem 110 represents a part of robotic-arm apparatus 100. Additionally or alternatively, robotic hand 102 and/or robotic-arm apparatus 100 may send surface data 402 to computing subsystem 110 via a wireless connection, such as for an example in which computing subsystem 110 is a separate device.

Returning to FIG. 5, at step 520, one or more of the systems described herein may send, by the computing subsystem, the surface data to a user subsystem configured to instruct a glove to provide haptic feedback corresponding to the surface data to a user's hand. For example, as illustrated in FIG. 4, computing subsystem 110 may send surface data 402 to user subsystem 212 to instruct glove 206 to provide haptic feedback 404 to user's hand 208.

The systems described herein may perform step 520 of FIG. 5 in a variety of ways. In some embodiments, such as the example of FIG. 4, method 500 may include classifying, by computing subsystem 110, surface data 402 as at least one type of surface characteristic 406. In these embodiments, classifying surface data 402 may include training artificial-intelligence model 410 to correlate known surface data with known types of surface characteristics, such as type texture and/or any other suitable types of surface characteristics, and using trained artificial-intelligence model 410 to identify at least one type of surface characteristic 406 based on detected surface data 402. Additionally, in these embodiments, computing subsystem 110 may send surface data 402 to user subsystem 212 by compressing classified surface data 402 into at least one type of surface characteristic 406. Additionally or alternatively, computing subsystem 110 may send surface data 402 to user subsystem 212 via a wired connection and/or via a wireless connection.

In some examples, method 500 may further include receiving, by the computing subsystem, a motion of the glove worn by the user's hand, wherein the user subsystem coupled to the glove detects the motion. In these examples, method 500 may include sending, by the computing subsystem, the motion of the glove to the robotic-arm apparatus, wherein the robotic-arm apparatus mimics the motion of the glove. For example, as illustrated in FIGS. 2A and 2B, computing subsystem 110 may receive motion 210 from glove 206, which may include user subsystem 212 that detects any and all motions of glove 206. In this example, computing subsystem 110 may control robotic-arm apparatus 100 and may send motion 210 to robotic hand 102 to mimic glove 206.

In some embodiments, method 500 may further include instructing, by the computing subsystem, the robotic-arm apparatus to detect the surface data about the surface in the real-world environment based on the motion of the glove. As shown in FIG. 4, computing subsystem 110 may instruct robotic hand 102 of robotic-arm apparatus 100, via actuator 108, to detect surface data 402 about surface 112 based on motion 210 of glove 206. In these embodiments, motion 210 may be detected by user subsystem 212 and transformed into instruction 408 to move in a particular pattern.

Figure 6:
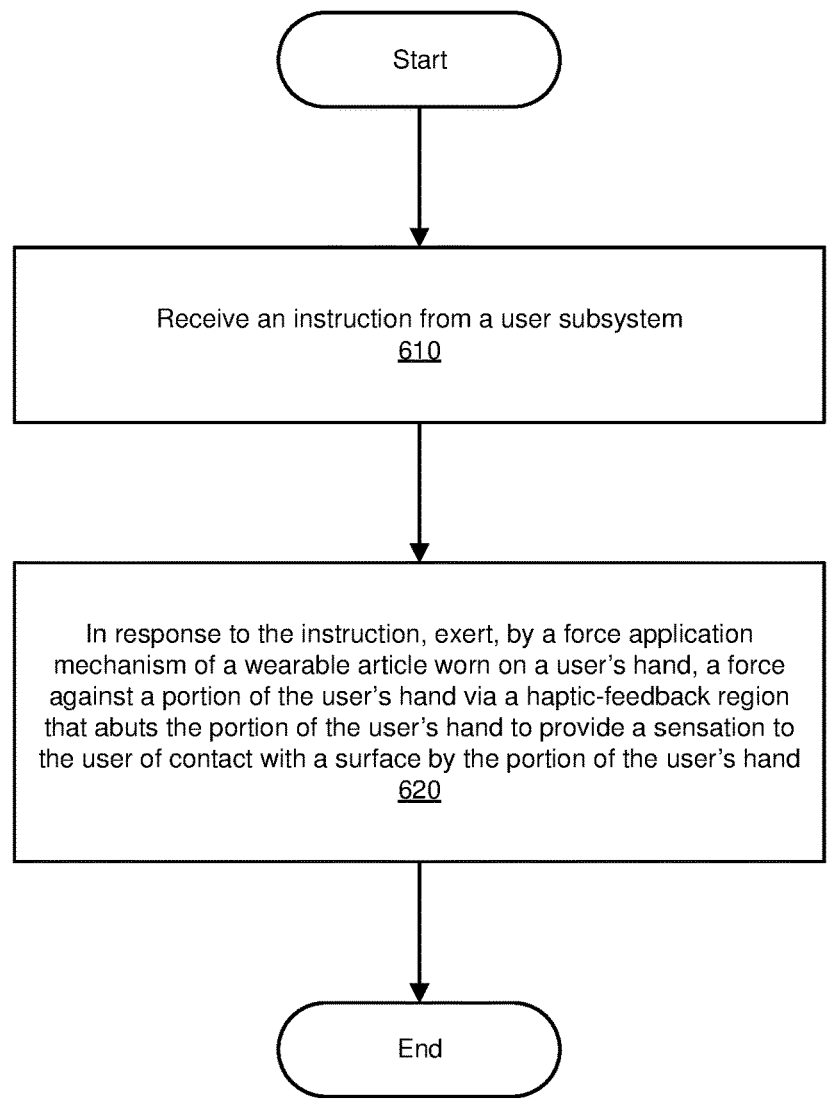
FIG. 6 is a flow diagram of an exemplary method for providing haptic feedback to a user via a haptic-feedback device that includes a wearable article according to some embodiments.

FIG. 6 shows a flow diagram of an exemplary computer-implemented method 600 for providing haptic feedback to a user via a haptic-feedback device that includes a wearable article, such as a glove. The steps shown in FIG. 6 may be performed by any suitable computer-executable code and/or computing system, including user subsystem 212 of glove 206 in FIG. 4. In one example, each of the steps shown in FIG. 6 may represent an algorithm whose structure includes and/or is represented by multiple sub-steps, examples of which will be provided in greater detail below.

As illustrated in FIG. 6, at step 610, one or more of the systems described herein may receive an instruction from a user subsystem. For example, as illustrated in FIG. 4, glove 206 may receive instruction 408 from user subsystem 212 at, for example, force application mechanism 301, 311, 321, 331, or 341 shown in FIGS. 3A-3E.

At step 620, one or more of the systems described herein may, in response to the instruction, exert, by a force application mechanism of a wearable article worn on a user's hand, a force against a portion of the user's hand via a haptic-feedback region that abuts the portion of the user's hand to provide a sensation to the user of contact with a surface by the portion of the user's hand. For example, in response to instruction 408, force application mechanism 301, 311, 321, 331, or 341 of glove 206 worn on a user's hand may exert a force against a portion of the user's hand (e.g., the user's fingertip) via a haptic-feedback region that abuts the portion of the user's hand to provide a sensation to the user of contact with a surface by the portion of the user's hand.

As discussed throughout the instant disclosure, the disclosed methods, systems, and apparatuses may provide one or more advantages over traditional haptic-feedback systems. For example, glove worn by a user may monitor the motions of the user's hand and send the motions to a robotic-arm apparatus. By mimicking the user's hand movements, the robotic-arm apparatus may interact with a real-world environment in a human-like manner. Additionally, by sensing surface information about the real-world environment and classifying information such as texture data, the robotic-arm apparatus may send the surface information back to the glove such that the glove may dynamically provide haptic feedback to the user. Various haptic feedback mechanisms may be utilized in an article, such as a glove, worn by the user to provide the user with realistic sensations associated with a variety of surfaces types having different characteristics, such as different textures. Furthermore, by using a mapping subsystem to map the real-world environment as a virtual environment and storing the mapping data in a local memory of the glove, the glove may reduce latency in transmission of haptic feedback to a user and may enhance the quality of the haptic feedback provided to the user while exploring the real-world environment. Incorporating the virtual environment into the combination of the robotic-arm apparatus and the glove may further enable the user to independently explore a virtual world. Thus, the methods, systems, and apparatuses described herein may improve the range of use and dynamic manipulation of a telepresence haptic-feedback system.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

As detailed above, the computing devices, systems, and/or subsystems described and/or illustrated herein broadly represent any type or form of computing device or system capable of executing computer-readable instructions. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A robotic-arm apparatus comprising:
   a robotic hand dimensioned to approximate a size and movement of a user's hand;
   at least one tactile-sensing pad coupled to at least a portion of the robotic hand, wherein the tactile-sensing pad is configured to dynamically detect surface data about a surface in a real-world environment; and
   an actuator configured to move the robotic hand to mimic a motion of a glove worn by the user's hand, wherein the glove is configured to receive the classified surface data and dynamically provide real-time haptic feedback corresponding to at least one type of surface characteristic of the classified surface data, as classified in real-time by an artificial-intelligence model using the surface data detected by the tactile-sensing pad, to the user's hand.

2. The robotic-arm apparatus of claim 1, wherein the tactile-sensing pad is coupled to the portion of the robotic hand such that the actuator is configured to move the tactile-sensing pad against the surface in the real-world environment.

3. The robotic-arm apparatus of claim 1, wherein the tactile-sensing pad sends the surface data about the surface in the real-world environment to a computing subsystem coupled to the robotic hand to classify the surface data as the at least one type of surface characteristic.

4. The robotic-arm apparatus of claim 3, wherein:
   the computing subsystem sends the classified surface data to the glove worn by the user's hand; and
   the glove provides the haptic feedback to the user's hand based on the at least one type of surface characteristic classified by the computing subsystem.

5. The robotic-arm apparatus of claim 3, wherein the actuator is communicatively coupled to the glove worn by the user's hand such that the actuator receives the motion of the glove via the computing subsystem.

6. The robotic-arm apparatus of claim 1, wherein the motion of the glove worn by the user's hand comprises an instruction to the robotic hand to interact with the real-world environment.

7. The robotic-arm apparatus of claim 1, wherein the tactile-sensing pad includes at least one sensor that detects vibration during contact between the tactile-sensing pad and the surface in the real-world environment.

8. The robotic-arm apparatus of claim 1, wherein the tactile-sensing pad includes at least one of an accelerometer, a gyroscope, a magnetometer, or an inertial measurement unit.

9. A haptic-feedback system comprising:
   a robotic-arm apparatus dimensioned to dynamically detect surface data about a surface in a real-world environment;
   a computing subsystem coupled to the robotic-arm apparatus, wherein the computing subsystem sends the surface data to a user subsystem; and
   a glove dimensioned to be worn on a user's hand, wherein the glove is configured to receive the classified surface data and dynamically provide real-time haptic feedback corresponding to at least one type of surface characteristic of the classified surface data, as classified in real-time by an artificial-intelligence model using the surface data detected by the robotic-arm apparatus, to the user's hand based on an instruction from the user subsystem.

10. The haptic-feedback system of claim 9, wherein the robotic-arm comprises at least one tactile-sensing pad configured to dynamically detect the surface data about the surface in the real-world environment.

11. The haptic-feedback system of claim 9, wherein the computing subsystem classifies the surface data detected by the robotic-arm apparatus by training the artificial-intelligence model to correlate the surface data with the at least one type of surface characteristic.

12. The haptic-feedback system of claim 11, wherein the computing subsystem:
   compresses the classified surface data to send to the user subsystem; and
   sends the artificial-intelligence model to the user subsystem.

13. The haptic-feedback system of claim 9, wherein the glove provides the haptic feedback to the user's hand by at least one of:
   limiting a movement of the user's hand;
   exerting a pressure on the user's hand; or
   stimulating a nerve of the user's hand.

14. The haptic-feedback system of claim 9, wherein the user subsystem translates the classified surface data into the instruction to the glove to provide the haptic feedback to the user's hand.

15. The haptic-feedback system of claim 9, wherein the computing subsystem comprises a mapping subsystem, wherein the mapping subsystem detects tactile-mapping data about the real-world environment for construction of a virtual environment.

16. The haptic-feedback system of claim 15, wherein the user subsystem stores the tactile-mapping data about the real-world environment in a local memory.

17. A method comprising:
   receiving, by a computing subsystem, surface data dynamically detected by a robotic-arm apparatus about a surface in a real-world environment; and sending, by the computing subsystem, the surface data to a user subsystem configured to instruct a glove to receive the classified surface data and dynamically provide real-time haptic feedback corresponding to at least one type of surface characteristic of the classified surface data, as classified in real-time by an artificial-intelligence model using the surface data detected by the robotic-arm apparatus, to a user's hand.

18. The method of claim 17, further comprising classifying, by the computing subsystem, the surface data as the at least one type of surface characteristic, wherein classifying the surface data comprises:
   training the artificial-intelligence model to correlate known surface data with known types of surface characteristics; and
   using the trained artificial-intelligence model to identify the at least one type of surface characteristic based on the detected surface data.

19. The method of claim 18, wherein sending the surface data to the user subsystem comprises at least one of:
   compressing the classified surface data into the at least one type of surface characteristic;
   sending the surface data via a wired connection; or
   sending the surface data via a wireless connection.

20. The method of claim 17, further comprising:
   receiving, by the computing subsystem, a motion of the glove worn by the user's hand, wherein the user subsystem coupled to the glove detects the motion; and
   sending, by the computing subsystem, the motion of the glove to the robotic-arm apparatus, wherein the robotic-arm apparatus mimics the motion of the glove.

* * * * *